United States Patent [19]

Godbersen

[11] Patent Number: 4,955,778
[45] Date of Patent: Sep. 11, 1990

[54] BOAT TRAILER PIVOTAL ROLLER KEEL SUPPORT ASSEMBLY

[76] Inventor: Byron L. Godbersen, Lake LaJune Estates, Ida Grove, Iowa 51455

[21] Appl. No.: 351,928

[22] Filed: May 15, 1989

[51] Int. Cl.$^5$ ................................................ B60P 3/10
[52] U.S. Cl. ..................................... 414/534; 414/482; 280/414.1
[58] Field of Search ............... 414/529, 532, 533, 534, 414/482, 483, 484; 280/414.1, 414.2, 414.3

[56] References Cited

U.S. PATENT DOCUMENTS

| | | | |
|---|---|---|---|
| 2,834,492 | 5/1958 | Roy, Sr. et al. | 414/534 X |
| 3,003,655 | 10/1961 | Bennett | 414/483 |
| 3,026,981 | 3/1962 | Youtie | 414/534 X |
| 3,077,276 | 2/1963 | Thwreatt | 414/534 |
| 3,173,558 | 3/1965 | Futch | 414/534 |
| 3,228,543 | 1/1966 | Cowan | 414/531 |
| 3,785,677 | 1/1974 | Calkins | 414/534 X |
| 3,812,986 | 5/1974 | rogers | 414/534 |
| 3,888,367 | 6/1975 | Cox . | |
| 3,947,924 | 8/1976 | Ullman, Jr. | 414/531 |
| 4,519,738 | 5/1985 | Wood | 414/483 |
| 4,697,976 | 10/1987 | Godbersen . | |
| 4,779,887 | 10/1988 | Briggs | 280/414.1 |

*Primary Examiner*—Frank E. Werner
*Assistant Examiner*—John VandenBosche
*Attorney, Agent, or Firm*—Henderson & Sturm

[57] ABSTRACT

A boat trailer having a pair of laterally spaced frame members, a cross member unit disposed between the frame members, a keel support assembly mounted on the cross member unit intermediate thereof and including a first bracket unit with one portion pivotally mounted to and disposed below the center of the cross member unit, with flanges extended forwardly and rearwardly of the cross member, and with a roller unit pivotally mounted on the forwardly and rearwardly extended flanges of the bracket unit, each roller unit having one or more rollers arranged in a plane common with each other and with the center of the cross member, and whereby the central keel rest upon the rollers and the keel to the sides thereof rest upon the cross member unit.

4 Claims, 2 Drawing Sheets

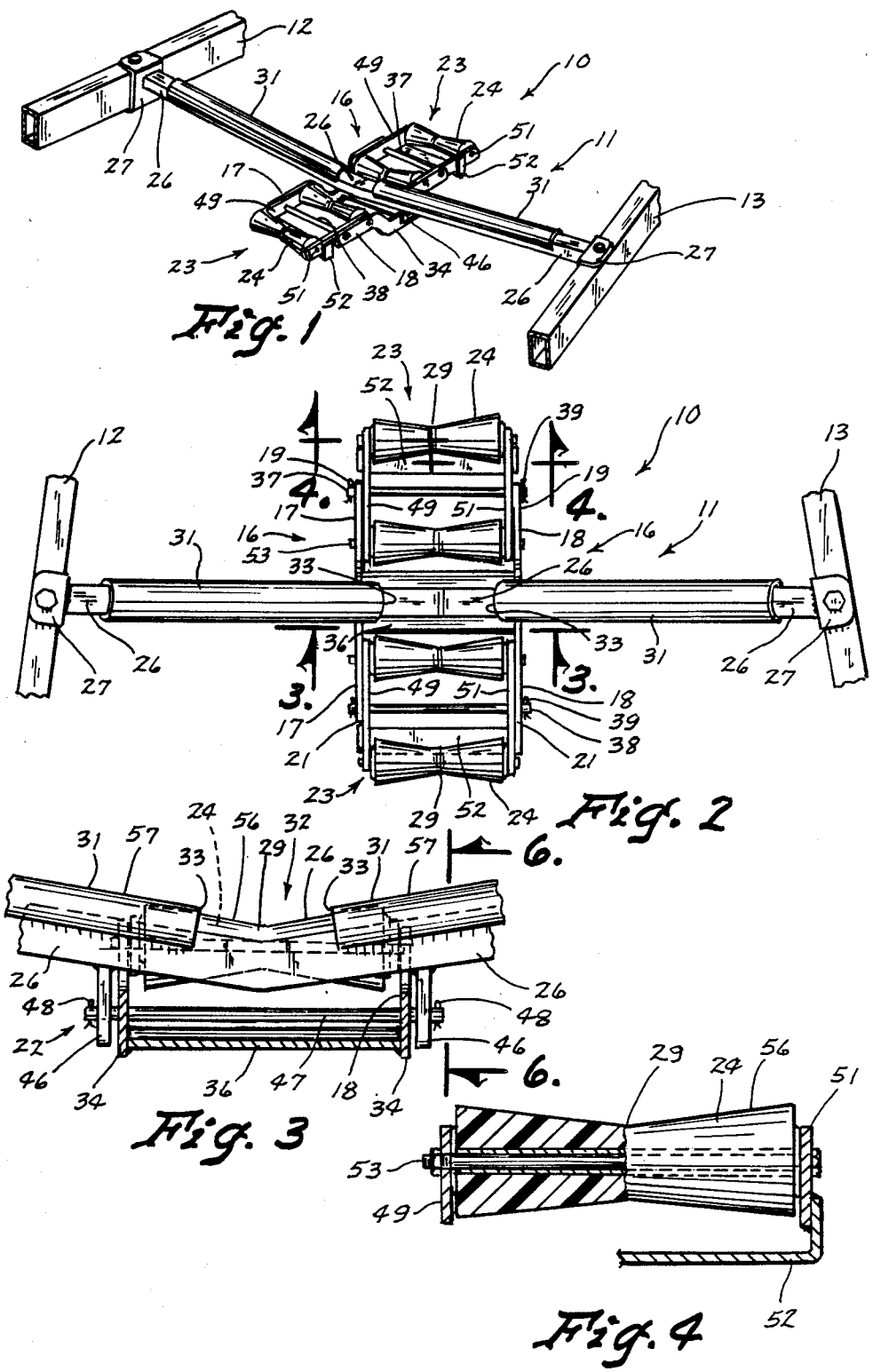

BOAT TRAILER PIVOTAL ROLLER KEEL SUPPORT ASSEMBLY

TECHNICAL FIELD

The present invention relates generally to boat carrying trailers, and more particularly to those of the type in which a longitudinal frame having a tongue and hitch for attachment to a prime mover is equipped with support units of a roller type structure engaging the keel and the bottom of the boat hull adjacent the bow and stern, respectively, the support units mounted at the forward and rearward cross member elements, the frame having a pair of ground wheel adjacent the rear thereof. To load and unload the boat to and from the trailer, the trailer is moved into the water a sufficient distance to enable the boat to float on and off the trailer, as controlled by a winch assembly adjacent the hitch.

BACKGROUND ART

With an ever-increasing number of different sized and shaped boats, the contemporary trailers have tended to develop an ever-increasing arrangement of bow, keel and stern supports for accommodating the great variety of trailers. Proper distribution of the weight of the trailer on the frame such that pressure on the tongue will accommodate a balanced connection to the prime mover has been attempted by having, for example, one or more types of central and side keel support assemblies mounted on the cross member at the forward part of the frame. Examples of various type forward keel support devices are shown in co-pending applications, Ser. Nos. 07/176,209 and 07/287,170 of the inventor, and U.S. Pat. No. 3,888,367. Although the designated prior art shows decided advantages over that type of keel support assemblies disclosed in the past, it is believed that the present invention has advantages of equal weight distribution over a more extensive area of the central keel of the boat.

DISCLOSURE OF THE INVENTION

In a boat trailer for transporting a boat or the like, the trailer including a pair of laterally spaced frame members and a cross member connected to and disposed transversely between the frame members, an assembly mounted intermediate the cross member for movably supporting the central keel of a boat comprising a first bracket unit including a pair of transversely connected and spaced brackets, each of which is U-shaped, having a lower portion, and with a pair of flanges extended forwardly and rearwardly of the lower portion at the upper ends thereof, the flanges disposed in a common plane; a unit for mounting the first bracket unit to the cross member for pivotal movement in a vertical plane about a transverse, normally horizontal axis, the brackets spaced equidistantly on opposite sides of the center line of the trailer and with the flanges extended forwardly and rearwardly of the cross member; and one or more roller members rotatably mounted to each of the flanges fore and aft of the cross member in longitudinally spaced relation relative to the trailer, and with a longitudinal axis of each roller member extended transversely between the frame members, and whereby the central keel of the boat can rest on the roller members and with the sides of the keel thereat resting on the cross member.

The invention further discloses a cushioning device mounted on each side of the cross member, with the cross member having a V-shape such that the central portion thereof is open; and further with a second bracket unit pivotally mounted on the flanges of the first bracket unit, and with all roller members mounted on both first and second bracket units being in a plane common with each other and with the central part of the cross member, and further with the roller members having an hour-glass shape the circumferential surface of which is disposed horizontally below the cushioning devices thus ensuring that the central keel rests upon the roller members with the side portions of the keel resting upon the cushioning devices.

Applicant's improvement resides further in providing for full-line support of the keel centrally thereof and to the sides thereof by not only the roller members but also by supporting engagement therewith by the cross member; and with the roller bracket arrangement providing an articulated engagement longitudinally of the central keel to ensure equal weight distribution on either side, fore and aft, of the cross member.

BRIEF DESCRIPTION OF THE DRAWINGS

These and other attributes of the invention will become more clear upon a thorough study of the following description of the best mode for carrying out the invention, particularly when reviewed in conjunction with the accompanying drawings, wherein:

FIG. 1 is a perspective view of a fragmentary portion of the boat trailer of the present invention, showing the pivotal roller keel support assembly mounted on a cross member unit disposed between a pair of conventional, transversely spaced frame members of the boat trailer;

FIG. 2 is a top plan view thereof;

FIG. 3 is an enlarged sectional view taken along the line 3—3 in FIG. 2;

FIG. 4 is an enlarged sectional view taken along the line 4—4 in FIG. 2;

BEST MODE FOR CARRYING OUT THE INVENTION

The pivotal roller keel support assembly of this invention is indicated generally at (10) in FIG. 1 and is mounted centrally on a cross member unit (11) disposed transversely between a pair of frame members (12), (13) shown in fragmentary form. The frame members (12), (13) are elements of a conventional boat trailer frame as shown and described in my co-pending application, Serial No. 07/176,209 entitled Load Guide for a Boat Trailer, the description of which is incorporated fully herein by reference.

Figure 5:
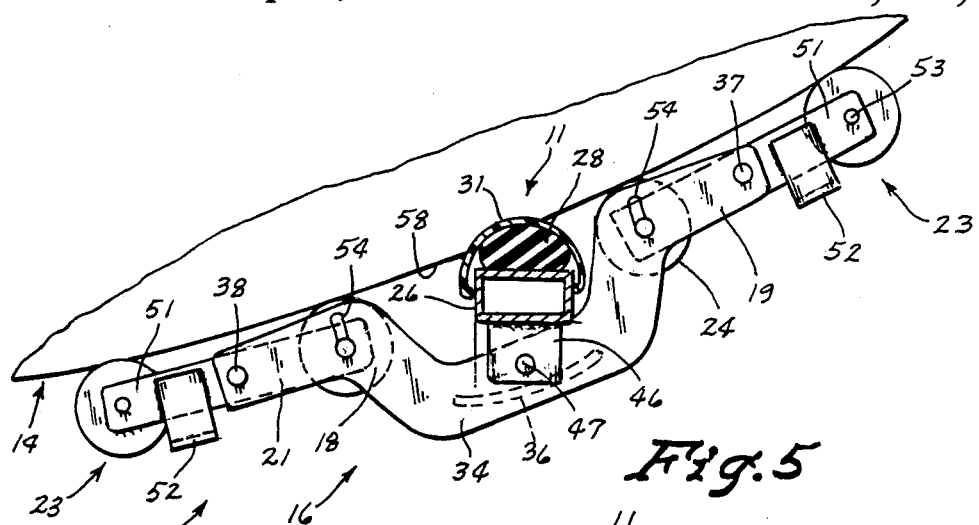
FIG. 5 is a side elevational view of the pivotal roller keel support assembly shown in FIG. 2, showing one pivoted position thereof and with the keel of a boat supported thereon.

The support assembly (10) for supporting the keel of a boat, indicated generally at (14) in FIG. 5, comprises generally a first bracket unit (16) including a pair of transversely connected and spaced brackets (17), (18) each of which has front and rear flanges (19), (21) disposed in a common plane (FIG. 6); a mounting unit (22) (FIG. 3) mounting the bracket unit (16) to the cross member unit (11) for pivotal movement in a vertical plane about a transverse, normally horizontal axis, the brackets (17), (18) spaced equidistantly on opposite sides of an imaginary centerline (not shown) of the trailer, and with the flanges (19), (21) spaced equidistantly fore and aft (FIG. 6) of the cross member, and wherein the central keel (14) of the boat can rest on the cross member unit (11); and a roller unit (23) (FIGS. 2 and 6) pivotally mounted on each of the flanges (19), (21), and with one or more hour-glass shaped rollers (24) rotatably mounted on each roller unit (23) such that the rollers (24) are longitudinally spaced relative each other and the trailer, and whose longitudinal axes extend transversely between the frame members (12), (13).

More particularly, the cross member unit (11) comprises a cross member (26) of a slight V-shape in side elevation attached by outer brackets (27) to the respective frame members (12), (13). Although the cross member (26) may be integral, it may also be of two portions which are secured as by welding at their intermating ends. A pair of elongated semi-circular pads (28) of resilient material (FIGS. 2 and 5) are mounted on the upper surface of the cross member (26), being disposed between the center (29) (FIG. 3) of the cross member (26) and the outer brackets (27); and which pads (28) are embraced by another like pair of elongated semi-circular covers (31) of plastic or the like, the covers (31) securing the pads (29) to the cross member (26). Referring particularly to FIG. 3, it will be seen that a transverse space (32) exists between the inner ends (33) of the covers (31), which inner ends (33) are equidistantly spaced from the cross member center (29) to form the space (32).

The first bracket unit (16) comprises a pair of flat, U-shaped elongated brackets (17), (18), each having a lower portion (34) (FIG. 6) and with upper flanged portions (19), (21) termed "flanges" hereinafter. The brackets (17), (18) are connected by a plate (36) (FIG. 3) welded across the lower portions (34) thereof, and with a pair of interconnecting rods (37), (38) (FIG. 6) connecting the outer ends of the flanges (19), (21) as by cotter pins (39) or like fastening devices.

Figure 6:
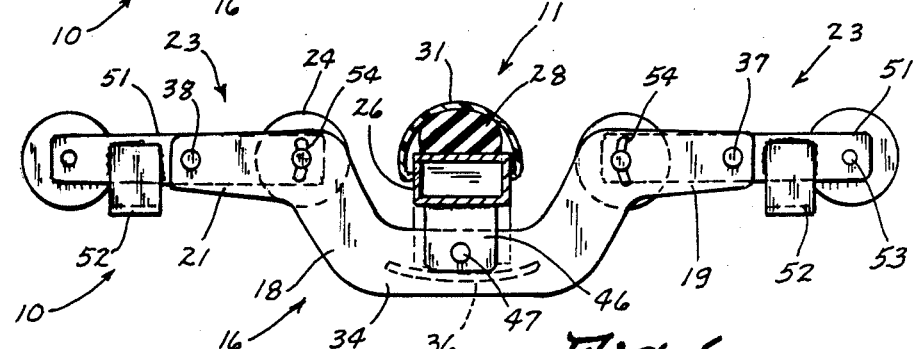
FIG. 6 is a view similar to FIG. 5, showing a different position of the support assembly relative to the cross member unit.

The mounting unit (22) (FIG. 3) comprises a pair of transversely spaced elements (46) (FIG. 3), each element (46) being secured to an underside of the cross member (26) and equidistantly spaced outwardly from the center (29) of the cross member (26), and wherein a pivot rod (47) extends through openings provided in the depending elements (46) and in the lower portions (37) of each bracket (34), (36), the rod (47) being secured by cotter pins (48) or the like, such that the first bracket unit (16) is pivotally connected to the cross member unit (11) at a pivot point below the cross member unit (11) (FIG. 6). This arrangement provides for the first bracket unit (16) and any related parts pivoting about a normally horizontally extended axis, the pivot rod (47), and within a normally vertical plane as best indicated in FIGS. 5 and 6.

Referring particularly to FIGS. 2, 4 and 6, it will be seen that each roller unit (23) comprises a pair of transversely spaced flat, elongated and straight plates (49), (51), the plates being interconnected in transversely spaced relationship between the brackets (17), (18) by a U-shaped member (52) which is welded to the plates (49), (51) at the outer ends thereof (FIG. 4), and wherein appropriate openings are formed in each end of each plate (49), (51) for the insertion therein of the shaft ends (53) of one or more hour-glass shaped hard rubber rollers (24). For pivotal movement of the roller units (23) about the outer ends of the respective interconnecting rods (42), (43), the flanges (19), (21) are inserted through openings (not shown) centrally of the plates (49), (51). Arcuately formed slots (54) (FIG. 6) are formed inwardly of each flange (19), (21) so not only can each roller unit (23) pivot about its respective rod (37) or (38), but also a limit of that pivoting movement is provided due to the length of each arcuate slot (54).

It will be noted that the rollers (24) are longitudinally spaced relative to each other and to the trailer frame members (12), (13), and with the longitudinal axis of each roller (24) extended transversely between the frame members (12), (13). Referring particularly to FIG. 3, it will also be noted that the circumferential surface of each roller indicated at (56) is below the surfaces (57) of the cross member covers (31) at their inner ends, thereby enabling the center keel indicated at (58) in FIG. 5 to nest within the rollers (24) while portions of the keel (14) on either side of the center (58) thereof rest on the cross member unit covers (31) (FIG. 3) for a full-line support of the keel (14) and boat hull in that area. It will be noted further that the rollers (24) and the cross member unit (11) (FIG. 6) lie in a common plane further providing for equal weight distribution of the boat along and on opposite sides of the cross member unit (11).

Figure 7:
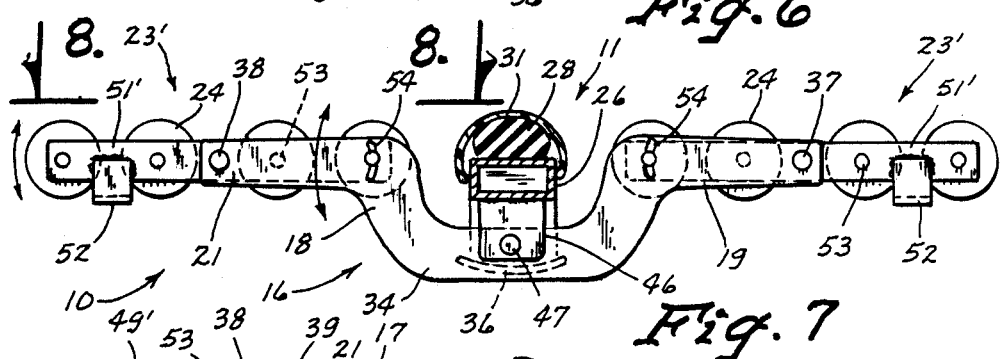
FIG. 7 is a view similar to FIG. 6, and showing a modified version of the pivotal roller keel support assembly of this invention.
Figure 8:
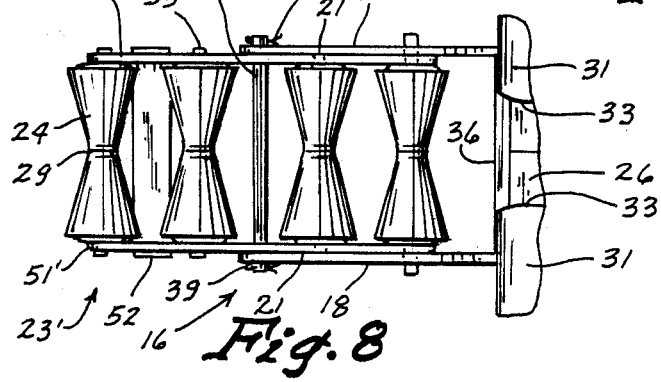
FIG. 8 is a plan view taken along the line 8—8 in FIG. 7.

A modification of the support assembly (10) is illustrated in FIGS. 7 and 8 wherein the length of the plates (49'), (51') of the roller units (23') are elongated such that rather than a pair of rollers (24) being rotatably mounted therein, a quartet of rollers (24) are mounted on the elongated plates (49'), (51'), with a pair of rollers (24) being mounted on opposite sides of the interconnecting rods (37), (38). The articulation of the roller units (23') relative to the pivotal bracket unit (16) again ensures the full and equal weight distribution of the boat keel and hull on the cross member unit (11) via the pivotal roller keel support assembly (10).

Accordingly, it can be seen that the illustrated embodiment and one modification thereof of the present invention accomplishes all of the objectives referred to hereinbefore. Obviously, many modifications and variations of the present invention are possible in light of the above teachings. It is therefore to be understood that, within the scope of the appended claims, the invention may be practiced otherwise than as specifically described.

I claim:

1. In a boat trailer, for transporting a boat, the trailer including a pair of laterally spaced frame members and a cross member connected to and disposed transversely between the frame members, an assembly mounted intermediate the cross member for movably supporting the central keel of a boat comprising:

bracket means including a pair of transversely connected and spaced brackets each of which has front and rear flanges disposed in a common plane;

means mounting said bracket means to the cross member for pivotal movement in a vertical plane about a transverse normally horizontal axis, said brackets spaced equidistantly on opposite sides of the centerline of the trailer and with said front and rear flanges spaced equidistantly fore and aft of the cross member and wherein the central keel of a boat can rest on the cross member; and a roller unit pivotally mounted to each of said flanges, and with one or more rollers rotatably mounted on each roller unit, and with the longitudinal axis of each roller extended transversely between the frame members, and further wherein said brackets are U-shaped, and with said means mounting said bracket means to the cross member at a pivot point below the cross member.

2. The central keel supporting assembly of claim 1, and further wherein each of said brackets has a lower portion thereof disposed below the cross member, and with said flanges disposed generally in a plane common with a central portion of the cross member.

3. The central keel supporting assembly of claim 2, and further wherein each said roller unit includes a pair of interconnected transversely spaced plates disposed intermediate said flanges;

means pivotally fastening each said roller unit to said bracket means for pivotal relationship in a normally vertical plane relative thereto; and said one or more roller members rotatably mounted to each of said plates.

4. In a boat trailer for transporting a boat, the trailer including a laterally spaced pair of frame members, an assembly mounted intermediate said frame members for movably supporting the keel of a boat comprising:

a cross member unit including a V-shaped cross member connected to and disposed transversely between the frame members, said unit including further a pair of keel cushioning devices mounted in transversely spaced relation on top of said cross member whereby to leave an open space at the central portion of said cross member;

U-shaped brackets mounted to the cross member at a pivot point below the cross member including a pair of transversely connected and spaced brackets each of which has front and rear flanges disposed in a common plane;

means mounting said brackets to the cross member for pivotal movement in a vertical plane about a transverse normally horizontal axis, said brackets spaced equidistantly on opposite sides of the centerline of the trailer and with said front and rear flanges spaced equidistantly fore and aft of the cross member and wherein the central keel of a boat can rest on the cross member unit cushioning devices; and a roller unit pivotally mounted to each of said flanges, and with one or more rollers rotatably mounted on each roller unit, and with the longitudinal axis of each roller extended transversely between the frame members, and with said roller members having an hour-glass shape the circumferential surface of which extends across said open space and is disposed in a normally horizontal plane below said cushioning devices, whereby the central keel of the boat nests upon the said rollers.

* * * * *